United States Patent
Beall et al.

(10) Patent No.: US 6,928,224 B2
(45) Date of Patent: Aug. 9, 2005

(54) LASER-INDUCED CRYSTALLIZATION OF TRANSPARENT GLASS-CERAMICS

(75) Inventors: George H. Beall, Big Flats, NY (US); Nicholas F. Borrelli, Elmira, NY (US); Linda R. Pinckney, Corning, NY (US)

(73) Assignee: Corning Incorporated, Corning, NY (US)

(*) Notice: Subject to any disclaimer, the term of this patent is extended or adjusted under 35 U.S.C. 154(b) by 26 days.

(21) Appl. No.: 09/969,237

(22) Filed: Oct. 2, 2001

(65) Prior Publication Data

US 2002/0159740 A1 Oct. 31, 2002

Related U.S. Application Data

(60) Provisional application No. 60/274,527, filed on Mar. 9, 2001.

(51) Int. Cl.$^7$ .................................................. G02B 6/10
(52) U.S. Cl. ...................... 385/132; 385/129; 385/130; 385/141
(58) Field of Search ................................ 385/129–132, 385/141

(56) References Cited

U.S. PATENT DOCUMENTS

| | | | |
|---|---|---|---|
| 4,225,659 A | 9/1980 | Drexler | 430/5 |
| 4,396,720 A * | 8/1983 | Beall et al. | 501/5 |
| 4,987,575 A | 1/1991 | Alfano et al. | 372/41 |
| 5,198,912 A | 3/1993 | Ingwall et al. | 359/3 |
| 5,204,771 A | 4/1993 | Koga | 359/281 |
| 5,208,136 A | 5/1993 | Zanoni et al. | 430/290 |
| 5,375,012 A | 12/1994 | Borrelli et al. | 359/485 |
| 5,500,031 A * | 3/1996 | Atkins et al. | 65/386 |
| 5,504,771 A | 4/1996 | Vahala et al. | 372/94 |
| 5,550,654 A | 8/1996 | Erdogan et al. | 359/3 |
| 5,627,676 A | 5/1997 | Borrelli et al. | 359/494 |
| 5,633,966 A | 5/1997 | Nakaishi | 385/37 |
| 5,670,086 A | 9/1997 | Papdopoulos et al. | 252/301.4 |
| 5,717,517 A * | 2/1998 | Alfano et al. | 359/342 |
| 5,974,205 A | 10/1999 | Chang | 385/11 |
| 6,043,933 A | 3/2000 | Chang | 359/494 |
| 6,118,575 A | 9/2000 | Grubb et al. | 359/337 |
| 6,181,465 B1 | 1/2001 | Grubb et al. | 359/337 |
| 6,197,710 B1 * | 3/2001 | Ohara et al. | 501/4 |
| 6,226,433 B1 * | 5/2001 | Weber | 385/129 |
| 6,297,179 B1 * | 10/2001 | Beall et al. | 501/5 |
| 6,430,349 B1 * | 8/2002 | Hayden et al. | 385/132 |
| 6,678,453 B2 * | 1/2004 | Bellman et al. | 385/129 |
| 2004/0240821 A1 * | 12/2004 | Vernon et al. | 385/130 |

FOREIGN PATENT DOCUMENTS

| | | | | |
|---|---|---|---|---|
| JP | 59-104608 | * | 6/1984 | 385/130 |
| JP | 62-245205 | * | 10/1987 | 385/130 |

* cited by examiner

Primary Examiner—Rodney Bovernick
Assistant Examiner—Sung Pak
(74) Attorney, Agent, or Firm—Walter M. Douglas; Edward F. Murphy; James V. Suggs

(57) ABSTRACT

A waveguide structure includes a glass body and a waveguide pattern formed in the glass body by irradiating a predetermined track on the glass body with sufficient energy to grow a crystalline phase along the predetermined track.

20 Claims, 4 Drawing Sheets

LASER-INDUCED CRYSTALLIZATION OF TRANSPARENT GLASS-CERAMICS

CROSS-REFERENCE TO RELATED APPLICATIONS

This application claims benefit of U.S. Provisional Application Ser. No. 60/274,527, filed Mar. 9, 2001, entitled "Laser-Induced Crystallization of Transparent Glass-Ceramics, in the names of George H. Beall, Nicholas F. Borrelli, and Linda R. Pinckney, incorporated herein by reference.

This application relates to U.S. application Ser. No. 09/686,564, entitled "Transition-Metal Glass-Ceramic Gain Media," filed Oct. 11, 2000, in the name of George H. Beall, Nicholas F. Borrelli, Eric J. Mozdy, and Linda R. Pinckney, and assigned to the same assignee as this application, incorporated herein by reference.

This application relates to U.S. application Ser. No. 09/607,631, entitled "Patterning an Optical Property on an Optical Element," filed Jun. 30, 2000, in the name of Nicholas Borrelli, Donald M. Trotter, and Ljerka Ukrainczyk, and assigned to the same assignee as this application, incorporated herein by reference.

BACKGROUND OF INVENTION

1. Field of the Invention

The invention relates generally to photonic applications. More specifically, the invention relates to a method for forming a planar waveguide structure.

2. Background Art

Planar waveguide structures, such as employed in planar amplifiers and planar waveguide lasers, are desirable in micro-optics because they are compact (in comparison to fiber-based waveguide structures) and can be integrated on the same chip with other components. Generally speaking, planar waveguide structures, include a planar core layer supported on a substrate and a cladding layer formed on the core layer. The substrate and cladding have a lower refractive index than the core layer so that optical radiation is confined by total internal reflection within the walls separating the core layer from the substrate and cladding. Typically, the core layer comprises an array of waveguide cores (or dielectric strips) within which optical radiation propagates.

Current methods for making planar waveguide structures such as described above involve providing a substrate having a clean flat and smooth surface. Typically, the substrate is made of silicon or silica. A material having a high refractive index, typically a silicate, is then deposited on the substrate to form the core layer. For applications such as planar amplifiers, the core layer is doped with an optically active element, typically a rare-earth metal such as erbium. Such an optically active element is excited by laser light at a selected wavelength to produce more light (amplification) at the same wavelength. The core layer is patterned to form a waveguide pattern, usually by some variation of a lithography/etching process or bias-sputtering/etching process. After forming the waveguide pattern, a low-index cladding layer, e.g., silica, is deposited on the waveguide pattern to form the complete waveguide structure. If the substrate is made of a high-index material such as silicon, a low-index buffer layer is typically deposited on the substrate prior to depositing the core layer.

The two main materials currently used for fabricating planar waveguide structures are crystalline materials, such as $LiNbO_3$, $Al_2O_3$, and $Y_2O_3$, and glass materials, such as silica-based glass and phosphate-based glass. Recently, there has been an interest in using transparent glass-ceramics in photonic applications. The interest arises from the desirable optical properties of transparent glass-ceramics doped crystals for such photonic devices as lasers and amplifiers. Transparent glass-ceramics also offer the advantage of glass fabrication together with the optical behavior of a crystal. As an example, U.S. application Ser. No. 09/686,564 (the '564 application) by Beall et al, supra, discloses a transparent glass-ceramic that provides gain over every wavelength that is conceivably of interest in telecommunications today. The glass-ceramic gain media comprises a transition-metal-doped glass in which extremely small crystals are internally nucleated. The crystals are formed from constituent materials of the original glass melt and are uniformly dispersed throughout the glass. Because the gain media is glass-based, it can be readily spliced to silica glass fibers. The '564 application discloses $Cr^{+4}$/forsterite glass-ceramic materials which emit at wavelengths ranging from about 900 nm to 1400 nm and $Cr^{+4}$/willemite glass-ceramic materials which emit at wavelengths ranging from about 1100 nm to about 1700 nm.

The crystals in the glass-ceramic provide the glass-ceramic with a bulk refractive index different from the precursor glass material. Waveguide structures can take advantage of this feature if the crystals can be locally produced along a given track. The '564 application describes an internal nucleation method by which crystals are uniformly dispersed through the glass material. To produce a waveguide pattern, better control is needed over where the crystals are formed in the glass material. Therefore, what is desired is a method of locally producing a crystalline phase in a glass material. U.S. application Ser. No. 09/607,631 (the '631 patent) by Borrelli et al, supra, discloses a method for patterning an optical material on an optical element. In embodiments disclosed in the '631 patent, an energy source, such as a $CO_2$ laser, was used to locally heat a birefringent glass having ellipsoidal metal halide particles dispersed therein. The localized heating resulted in the ellipsoidal metal halide particles relaxing to form spheres and removed the birefringence from the locally heated regions.

SUMMARY OF INVENTION

In one aspect, the invention relates to a waveguide structure which comprises a glass body and a waveguide pattern formed in the glass body by irradiating a predetermined track on the glass body with sufficient energy to grow a crystalline phase along the predetermined track.

In another aspect, the invention relates to an optical device which comprises a waveguide structure and a means for pumping radiation into the waveguide structure. The waveguide structure comprises a glass body and a waveguide pattern formed in the glass body by irradiating a predetermined track on the glass body with sufficient energy to grow a crystalline phase along the predetermined track.

In another aspect, the invention relates to a laser device comprising an optical resonator, a waveguide structure disposed within the optical resonator, and means for pumping radiation into the optical resonator. The waveguide structure comprises a glass body and a waveguide pattern formed in the glass body by irradiating a predetermined track on the glass body with sufficient energy to grow a crystalline phase along the predetermined track.

In another aspect, the invention relates to a method for producing a crystalline phase in a glass body which comprises moving a laser source relative to a glass body along a predetermined track on the glass body. The method further includes operating the laser source to provide sufficient energy to raise the temperature of the glass body along the predetermined track to grow a crystalline phase along the predetermined track Other features of the invention will be apparent from the following description and the appended claims.

DETAILED DESCRIPTION

Embodiments of the invention provide a method for writing a predetermined pattern of a crystallized material on and in an otherwise glass material using a laser beam. The laser crystallized region produced has a refractive index that is different from the surrounding glass material. In one embodiment, the invention takes advantage of such refractive index change to produce a waveguide structure having a desired waveguide pattern. Such a waveguide structure can be used in planar amplifiers and other planar waveguide devices. In general, the writing process involves moving a laser beam relative to the glass material to heat the glass material to a temperature sufficient to grow the crystalline phase along a given track. To form the crystals in the glass material, the wavelength of the laser should possess sufficient absorption to produce the required heating for forming the crystalline phase. Further, the laser should preferably have a focusable coherence length so that a high-resolution pattern can be formed on the glass body. Preferably, the laser has an output wavelength $\lambda$, where the glass has an absorption coefficient at $\lambda$ which is greater than 10 $cm^{-1}$. Other variations are possible with the general criteria being production of sufficient heat to produce the crystalline phase.

Figure 1A:
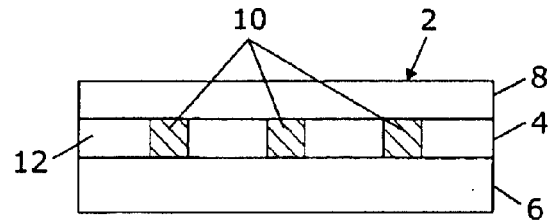
FIG. 1A shows a waveguide structure according to an embodiment of the invention.
Figure 1B:
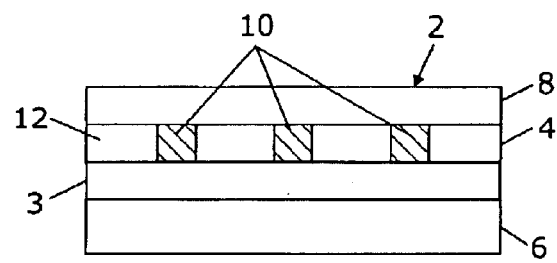
FIG. 1B shows a buffer layer between the core layer and the substrate shown in FIG. 1A.

Various embodiments of the invention will now be described with reference to the accompanying figures. FIG. 1A shows a waveguide structure 2 according to an embodiment of the invention. The waveguide structure 2 comprises a core layer 4 supported on a substrate 6 and a cladding layer 8 formed on top of the core layer 4. The cladding layer 8 may be formed on top of the core layer 4 by using a suitable deposition technique, such as plasma chemical vapor deposition, to deposit a cladding material, e.g., silica, on the core layer 4. For a waveguide structure, the cladding material has a lower index than the core layer 4. The substrate 6, which is also made of a material having a lower index than the core layer 4, may be attached to the core layer 4 by a suitable optical adhesive (not shown). In alternate embodiments, such as when the substrate is formed from a high-index material such as silicon, a buffer layer made of a low-index material, such as silica, may be formed between the substrate 6 and the core layer 4. FIG. 1B shows a buffer layer 3 between the substrate 6 and the core layer 4.

Figure 2A:
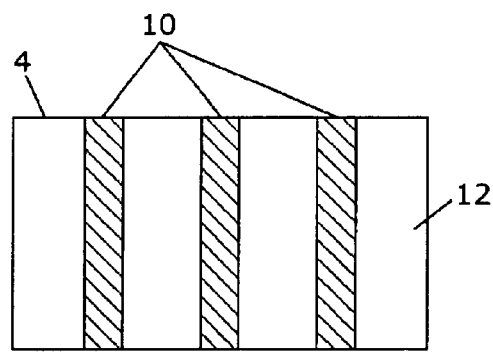
FIG. 2A shows a top view of the core layer shown in FIGS. 1A and 1B.

Returning to FIG. 1A, the core layer 4 comprises glass-ceramic or partially crystalline structures 10 (or waveguide cores) formed in a host glass material 12, such as a silicate glass. The glass-ceramic structures 10 have a higher refractive index than the surrounding glass material 12 so that optical radiation propagated through the glass-ceramic structures 10 are confined within the glass-ceramic e structures 10. FIG. 2A shows a top view of the core layer 4. In the illustrated embodiment, the crystalline structures 10 are arranged in a generally parallel direction within the glass material 12. It should be noted, however, that the invention is not limited to this pattern. In general, the waveguide pattern will be determined by the target application.

Figure 2B:
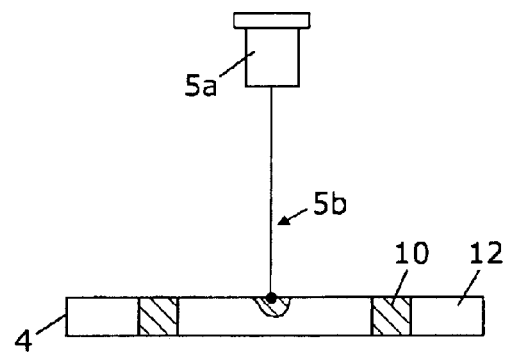
FIG. 2B shows a method for forming a crystalline phase in a glass material.

Referring to FIG. 2B, to form the glass-ceramic structures 10, a waveguide pattern is first designed. Then the waveguide pattern is used to control movement of a laser source 5a relative to the core layer 4. As the laser source 5a moves relative to the core layer 4, the beam 5b from the laser source 5a heats the glass material 12 along a track determined by the waveguide pattern. The heat if sufficient initiates formation of the crystalline phase in the glass material 12. A mask (not shown), such as a steel mask, may be mounted over the core layer 4 to protect the areas that should not be exposed by the laser beam 5b.

In an alternate embodiment, the laser source 5b may be held stationary, and the glass material 12 may be moved relative to the source 5b in accordance with the waveguide pattern. As the glass material 12 moves relative to the source 5b, the beam 5b from the laser source 5a will heat the glass material 12 along predetermined tracks determined by the waveguide pattern. As previously explained, the laser source 5b should provide sufficient energy to raise the temperature of the glass material 12 along the predetermined tracks so that the crystalline phase is formed.

For gain media, the glass material 12 is doped with an optically-active element, such as transition metal ions and rare-earth metal ions. The glass material 12 may be doped with the optically-active element during preparation of the glass or the optically-active element can be substituted into the glass as a solid solution. The solid solution is made by melting the glass with a compound containing the optically-active element and subsequently cooling the melt.

For shorter wavelength ranges, e.g., 1500 nm and below, the glass material 12 is preferably doped with transition-metal ions. The transition-metal ions contemplated for use as gain media include those transition metal ions which, when within a crystal host, are capable of providing gain or lasing at a wavelength in the range of about 900 nm to about 3000 nm. Preferably, the transition metal ions are selected from the group consisting of $V^{3+}$, $Cr^{3+}$, $Cr^{4+}$, $Co^{2+}$, $Fe^{2+}$, $Mn^{2+}$, $Ni^{2+}$, and $Ti^{3+}$. Particularly from the glass-ceramic materials, exhibiting properties that render them potentially suitable for use as gain media in optical amplifiers, include those where the glass-ceramic regions are comprised of forsterite ($Mg_2SiO_4$), monticellite ($CaMgSiO_4$), and $\alpha$- and/or $\beta$-willemite ($Zn_2SiO_4$), with $Cr^{4+}$ as the optically active ion. Alternatively, the crystalline phase can be lithium-germanate with $Cr^{3+}$ as the optically active ion., Alternatively, the crystalline phase can be lithium-magnesium orthosilicates, or lithium-zinc orthosilicates with $Cr^{4+}$ as the optically active ion.

Various modifications to the waveguide structure described above are possible without departing from the scope of the invention. For example, instead of writing the waveguide pattern in the core layer 4, the waveguide pattern may be written in either one or both of the substrate 6 (or buffer layer 3 in FIG. 1B) and cladding layer 8. In this case, the substrate and cladding layer 6, 8 would comprise a glass material in which a desired crystalline phase can be formed using the method of the invention. Further, the substrate 6 and/or the cladding layer 8 may be doped with optically-active elements, such as described above, while the core layer 4 is left undoped. This scheme can take advantage of the cladding-pumping technique shown in many cases to provide optimal output powers. Another example involves forming the substrate 6, the cladding layer 8, and the core layer 4 from a glass material in which a desired crystalline phase can be formed using the method of the invention. The substrate 6, cladding layer 8, and core layer 4 may be doped with optically-active elements, such as described above, where the index difference between the core layer 4 and substrate and cladding 6, 8 is still sufficient to act as a waveguide.

Figure 3:
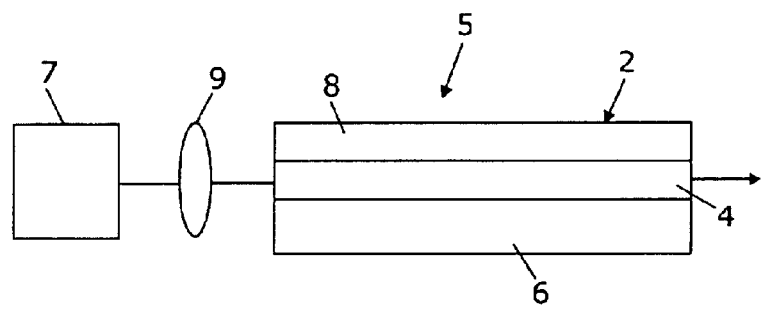
FIG. 3 shows a schematic of an optical amplifier incorporating a waveguide structure according to an embodiment of the invention.

The waveguide structure 2 (and the variations described above) is advantageously used as a gain medium in an optical amplifier, such as optical amplifier 5 in FIG. 3. The optical amplifier 5 comprises an optical pump radiation source 7 for pumping radiation into the core layer 4 so as to excite the optically-active elements in the core layer 4. The pumping source 7 typically includes a light source, which may be a semiconductor laser, a solid-state laser, a gas laser, a dye laser, or a flash lamp which emits radiation at a wavelength within the absorption region of the optically active ions. The optical amplifier 5 further includes coupling means 9 for coupling the light generated by the pumping source 7 into the core layer 4. The coupling means 9 may be either bulk optics or other waveguide structures, such as couplers. The light from the pumping source 7 propagates inside the waveguide cores in the core layer 4 and excites the optically-active ions to amplify the light. The light pumped into the core layer 4 may be either pulsed or continuous wave. As previously mentioned, the waveguide pattern in the core layer 4 may be suitably adjusted for the target application.

Figure 4:
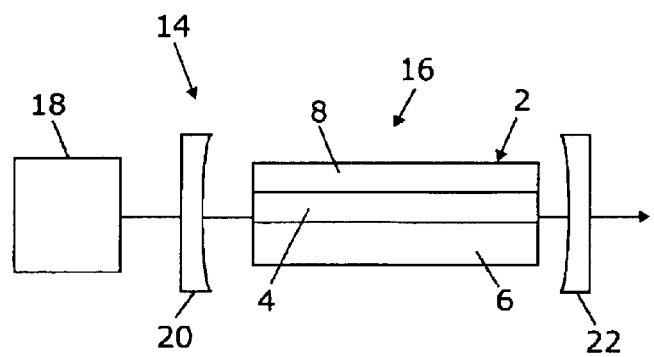
FIG. 4 shows a schematic of a waveguide laser incorporating a waveguide structure according to an embodiment of the invention.

The waveguide structure 2 (and the variations described above) may also be employed in various types of waveguide lasers. As an example, FIG. 4 shows a waveguide laser 14 incorporating the waveguide structure 2. The waveguide laser 14 comprises an optical resonator 16 and an optical pump radiation source 18, e.g., a semiconductor laser, a solid-state laser, a gas laser, a dye laser, or a flash lamp. In the illustrated embodiment, the optical resonator 16 is made of two high-reflective mirrors 20, 22. The waveguide structure 2 is disposed inside the optical resonator 16 so as to define an optical path between the two mirrors 20, 22. In operation, the optical pump radiation source 18 pumps radiation into the optical resonator 16, and the radiation is repeatedly passed through the waveguide structure 2, with a small portion exiting through the mirror 22 at each pass. The core layer 4 of the waveguide structure 2 may include optically-active elements, carried within the glass-ceramic host to provide a desired gain for the laser output. The crystal phase may include forsterite, monticellite, and $\alpha$- and/or $\beta$-willemite, YAG, lithium-germanate crystals, lithium-magnesium orthosilicates, and lithium-zinc orthosilicates.

The waveguide laser 14 may be operated in a continuous fashion wherein the radiation emitted from the resonator cavity is substantially constant with time. Alternatively, the waveguide laser may be operated in a mode-locked configuration, where multiple longitudinal modes of the laser cavity are phase-locked and thereby produce an output of repetitive pulses, separated in time by the round-trip propagation time of light through the resonator cavity. Alternatively, the laser 14 may be operated in a Q-switched configuration, where the loss of the cavity is controlled such that energy from the pump is stored in the gain medium for some period of time, then the amassed energy is released over a short interval of time. As a result, the laser 14 produces high-energy output pulses, separated by the cycle of the energy storage/release sequence. The Q-switching mechanism comprises saturable absorbing media, electro-optic modulators, acoustic-optic modulators, and oscillating bulk optics. Alternatively, the laser 14 may be operated in any combination of the above formats.

Various methods are known in the art which can be used to form the glass material for the core layer (4 in FIGS. 1A–4). One suitable method involves melting a batch of material having a desired composition. The melt is then cooled and simultaneously formed into a glass body of a predetermined configuration using conventional glass forming techniques. The invention has been demonstrated for the glass compositions listed in Table 1. The compositions in columns 1 through 8 correspond to those that would produce a spinel phase called gahnite, while the compositions in columns 9 and 10 correspond to those that would produce primarily forsterite and/or $\alpha$- and/or $\beta$-willemite. In Table 1, the glass compositions are shown as oxides. However, the actual batch ingredients for forming the glasses can include many materials, either as oxides or other compounds (such as hydroxides or halides), which, upon being melted together, will be converted into the desired glass-forming melt containing the proper oxide proportions. For example, high purity sand is conveniently employed as the source of $SiO_2$. It should be noted that the compositions in Table 1 are for illustration purposes and are not intended to limit the scope of the invention as otherwise described herein.

TABLE 1

| | Glass-Ceramic Compositions | | | | | | | | | |
|---|---|---|---|---|---|---|---|---|---|---|
| Wt % | 1 | 2 | 3 | 4 | 5 | 6 | 7 | 8 | 9 | 10 |
| $SiO_2$ | 42.2 | 40.9 | 41.6 | 40.7 | 37.4 | 32.8 | 54.8 | 59.3 | 44.0 | 41.5 |
| $Al_2O_3$ | 28.8 | 27.8 | 28.3 | 27.6 | 31.2 | 33.7 | 20.3 | 19.1 | 17.7 | 12.0 |
| ZnO | 23.0 | 22.2 | 22.5 | 22.0 | 24.9 | 27.0 | 16.1 | 9.0 | — | 36.5 |
| $K_2O$ | 2.2 | 2.1 | 2.1 | — | — | — | 2.3 | — | 16.3 | 8.5 |
| $Rb_2O$ | — | — | — | 1.4 | 1.4 | 1.4 | — | — | — | — |
| $Cs_2O$ | — | — | — | 1.4 | 1.4 | 1.4 | — | — | — | — |

TABLE 1-continued

Glass-Ceramic Compositions

| Wt % | 1 | 2 | 3 | 4 | 5 | 6 | 7 | 8 | 9 | 10 |
|---|---|---|---|---|---|---|---|---|---|---|
| $Na_2O$ | — | — | — | — | — | — | — | — | — | 1.5 |
| MgO | — | — | — | — | — | — | — | 2.5 | 17.0 | — |
| BaO | — | — | — | — | — | — | — | 2.1 | — | — |
| $TiO_2$ | 3.8 | 1.8 | 3.2 | 1.8 | 3.7 | 3.7 | — | 5.0 | 5.0 | — |
| $ZrO_2$ | — | 5.2 | 2.3 | 5.1 | — | — | 6.5 | 3.0 | — | — |

In a typical preparation of glass, the batch materials such as those listed in Table 1 are thoroughly mixed together in order to obtain a homogeneous melt. The melt is subsequently placed into crucibles, typically made of silica or platinum. The crucibles are placed in a furnace, and the glass batch is melted and maintained at a high temperature (e.g., 1450 to 1600° C.) for a period of time (e.g., from several hours to one day). The exact temperature and time needed for melting will depend on the glass composition. Thereafter, the melt is poured into a mold, where it cools to yield a glass body having desired dimensions. It should be recognized that various modifications are possible to this glass preparation process. For example, the glass body may be subjected to various heat-treatment cycles, to produce microstructures tailored to provide different mechanical and optical properties, e.g., strength, toughness or transparency.

A glass body prepared by a method such as described above or other suitable method provides a surface for thermally writing a pattern using a laser beam. As previously explained, for a planar amplifier or other planar waveguide device, the glass body preferably has a planar surface. If necessary, the glass body may be ground/polished before the writing process. For gain media, the glass body would be doped with an optically-active material, such as transition metal ions (e.g., $V^{3+}$, $Cr^{3+}$, $Cr^{4+}$, $Co^{2+}$, $Fe^{2+}$, $Ni^{2+}$, and $Ti^{3+}$) or rare-earth metal ions (e.g., $Er^{3+}$). The pattern would then be formed in the glass body by moving the laser beam along a given track on the glass body. Methods for controlling a laser beam to move along a desired track are well known, e.g., in processes such as electron beam lithography. The writing process may be accomplished with or without the aid of a mask to protect the regions not to be irradiated.

For planar amplifier/laser waveguide structure, the gain medium produced by the method of the invention is preferably $Cr^{4+}$/forsterite or $Cr^{4+}$/willemite. As previously mentioned, U.S. application Ser. No. 09/686,564 by Beall et al, supra, discloses that $Cr^{+4}$/forsterite emits at wavelengths ranging from about 900 nm to about 1400 nm, with a peak emission at about 1150 nm, while $Cr^{+4}$/willemite emits at wavelengths ranging from about 1100 nm to about 1700 nm. These emissions encompass the conventional band of 1530 to 1560 nm and demonstrate broadband emission in the short band (i.e., below 1500 nm) wavelength range. These spectral properties show that glass-ceramic materials comprising $Cr^{+4}$ dopant could open the gain window from 1100 nm to 1700 nm, corresponding to an order of magnitude increase in bandwidth over the current erbium technology. $Cr^{+4}$/willemite, for example, could alone cover a wavelength range of 1200 to 1650 nm.

Figure 5:
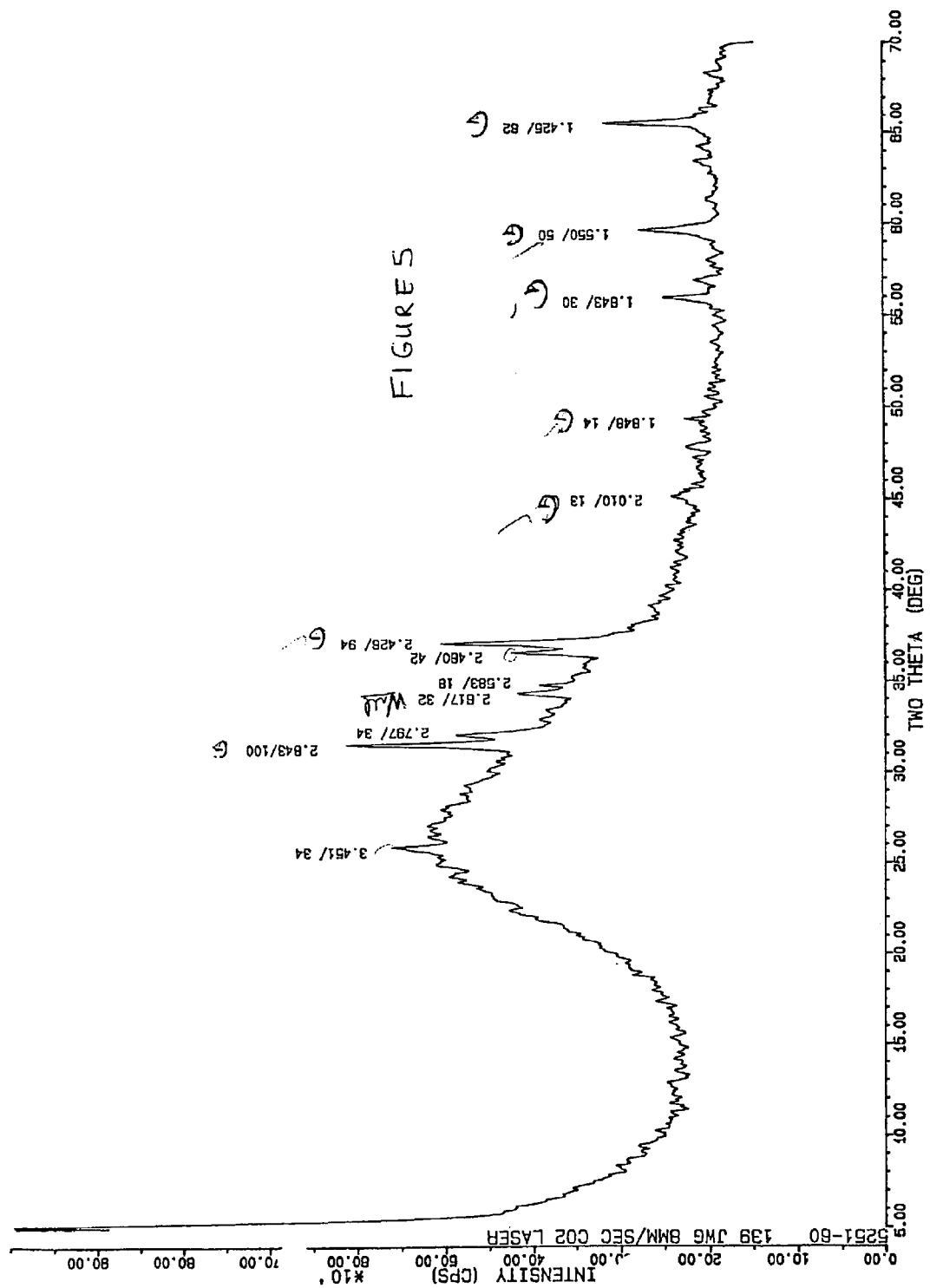
FIG. 5 is an X-ray diffraction pattern of a glass-ceramic that has been treated with a $CO_2$ laser according to one embodiment of the invention.

In the example which follows, a 4-W $CO_2$ laser with a wavelength of 10.6 µm is used to induce crystallization in a glass material having the composition (6) shown in Table 1 above. The laser beam was focused to a 0.5 mm spot and moved along a desired track on the glass at 8 mm/s. As previously mentioned, other types of laser beams can be suitably employed if they provide sufficient energy to induce crystallization. Further, the output power and the spot size of the laser beam may be varied according to the desired speed of the laser writing process. Thus, the choice of laser, the output level, the baser beam width, and the writing speed should be coordinated to achieve the desired crystallization. FIG. 5 shows an X-ray diffraction of the glass material after exposure by the laser. The graph in FIG. 5 shows the intensities of the diffracted beams at different angles during a 2θ scan. The distinctive diffraction pattern suggests that the crystalline structure is that of a gahnite. There are also some indications of the presence of a willemite phase.

Figure 6:
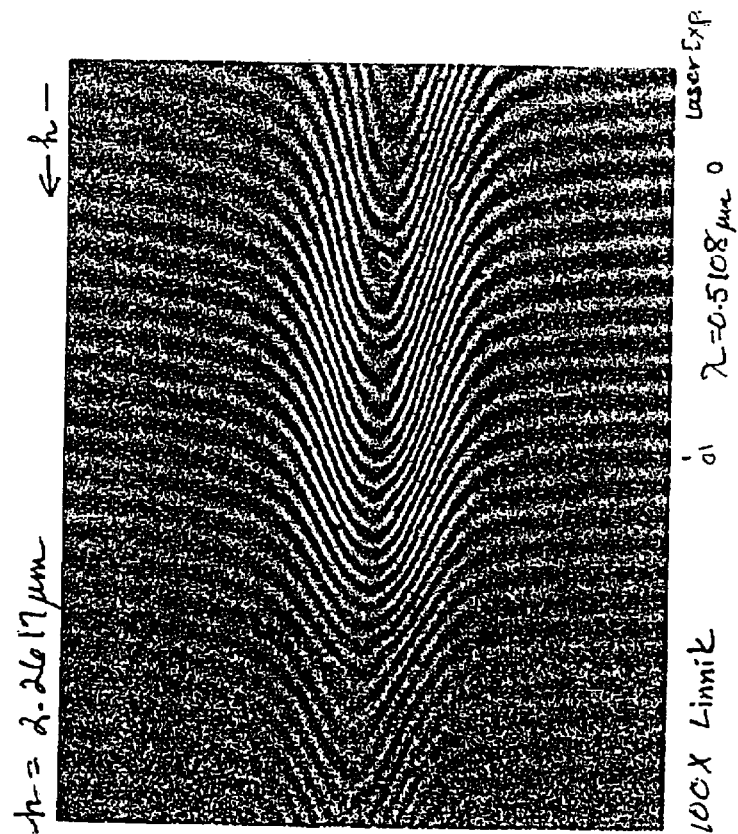
FIG. 6 is an interferometric microscope image of a glass-ceramic that has been treated with a $CO_2$ laser according to one embodiment of the invention present invention.

FIG. 6 shows an interferometric pattern indicating the increased refractive index in the exposed region of the glass. The interferometric pattern was obtained using a 510.8-nm laser light and recorded with a microscope. The wavefront fringe pattern is a result of different refractive indices in the different regions of the plate, i.e., the laser beam travels with different speeds in different regions due to the difference in refractive indices. The interferometric pattern clearly indicates a significantly higher refractive index in the laser exposed track (the middle track in FIG. 5) as compared with that of the surrounding unexposed areas. The higher refractive index is indicative of a glass-ceramic structure in the laser exposed track. The presence of a glass-ceramic structure is consistent with the distinct X-ray diffraction pattern shown in FIG. 5.

The invention can provide general advantages. The method of the invention provides for a crystalline phase to be formed locally in an otherwise glassy material. This allows patterns, such as waveguide patterns, to be formed in the glass material. The invention is particularly attractive when a desired photonic optical property can only be seen in a crystalline environment. With the ability to write a predefined pattern on a glass material, the method of the invention is particularly suitable for manufacturing photonic devices such as planar amplifiers, optical isolators, planar waveguide lasers, splitters, polarizers, optical circuit boards, and so forth. If desired, such devices may be manufactured from glass materials doped with desired transition metals or rare-earth metals.

While the invention has been described using a limited number of examples, those skilled in the art, having the benefit of this disclosure, will appreciate that other variations are possible without departing from the scope of the invention as disclosed herein. Accordingly, the scope of the invention should be limited only by the attached claims.

What is claimed is:

1. A waveguide structure, comprising:
   a glass body;
   a waveguide pattern comprising a waveguide core and a waveguide cladding, and wherein the waveguide core or the waveguide cladding includes a crystalline phase formed in the glass body by irradiating a predetermined track on the glass body with sufficient energy to grow a the crystalline phase along the predetermined track, the crystalline phase being selected from the group consisting of forsterite, monticellite, willemite, spinel, YAG, lithium-germanate, lithium-magnesium orthosilicates, and lithium-zinc orthosilicates.

2. The waveguide structure of claim 1, wherein the glass body is doped with transition metal ions selected from the group consisting of $V^{3+}$, $Cr^{3+}$, $Cr^{4+}$, $Co^{2+}$, $Fe^{2+}$, $Ni^{2+}$, and $Ti^{3+}$.

3. The waveguide structure of claim 1, wherein the glass body is doped with rare-earth metal ions.

4. The waveguide structure of claim 1, wherein the glass body is planar.

5. The waveguide structure of claim 4, wherein the waveguide core includes the crystalline phase, the waveguide structure further comprising a first layer of material having a lower index than the glass body formed on a first surface of the glass body, the first layer of material at least partially cladding the waveguide core.

6. The waveguide structure of claim 5, wherein the waveguide core includes the crystalline phase, the waveguide structure further comprising a second layer of material having a lower index than the glass body formed on a second surface of the glass body, the second layer of material at least partially cladding the waveguide core.

7. An optical device, comprising:
a waveguide structure comprising a glass body doped with transition metal ions or rare earth metal ions; and a waveguide pattern comprising a waveguide core and a waveguide cladding, and wherein the waveguide core or the waveguide cladding includes a crystalline phase formed in the glass body by irradiating a predetermined track on the glass body with sufficient energy to grow a crystalline phase along the predetermined track; and
means for pumping radiation into the waveguide structure.

8. The optical device of claim 7, wherein the waveguide core includes the crystalline phase, and wherein the waveguide structure further comprises a first layer of material formed on a first surface of the glass body and a second layer of material formed on a second surface of the glass body, the first and second layers of material having a lower index than the glass body, each of the first layer and the second layer at least partially cladding the waveguide core.

9. The optical device of claim 7, wherein the glass body is doped with transition metal ions selected from the group consisting of $V^{3+}$, $Cr^{3+}$, $Cr^{4+}$, $Co^{2+}$, $Fe^{2+}$, $Ni^{2+}$, and $Ti^{3+}$.

10. The optical device of claim 7, wherein the glass body is doped with rare-earth metal ions.

11. The optical device of claim 7, wherein the crystalline phase comprises one selected from the group consisting of forsterite, monticellite, willemite, spinel, YAG, lithium-germanate, lithium-magnesium orthosilicates, and lithium-zinc orthosilicates.

12. The optical device of claim 7, wherein the glass body is planar.

13. A method for producing a waveguide structure, comprising the steps of:
providing a glass body;
moving a laser source relative to the glass body along a predetermined track on the glass body; and
forming a waveguide pattern comprising a waveguide core and a waveguide cladding, wherein the waveguide core or the waveguide cladding includes a crystalline phase formed in the glass body by operating the laser source to provide sufficient energy to raise the temperature of the glass body along the predetermined track to grow a crystalline phase along the predetermined track to grow a crystalline phase selected from the group consisting of forsterite, monticellite, willemite, gahnite, YAG, lithium-germanate, lithium-magnesium orthosilicates, and lithium-zinc orthosilicates.

14. The method of claim 13, wherein the glass body is doped with wherein the glass body is doped with transition metal ions selected from the group consisting of $V^{3+}$, $Cr^{3+}$, $Cr^{4+}$, $Co^{2+}$, $Fe^{2+}$, $Ni^{2+}$, and $Ti^{3+}$.

15. The method of claim 13, wherein the glass body is doped with rare-earth metal ions.

16. The method of claim 13, wherein the waveguide core includes the crystalline phase, the method further comprising forming a first layer of material having a lower index than the glass body on a first surface of the glass body, the first layer at least partially cladding the waveguide core.

17. The method of claim 16, wherein the waveguide core includes the crystalline phase, the method further comprising forming a second layer of material having a lower index than the glass body on a second surface of the glass body, the second layer at least partially cladding the waveguide core.

18. The method of claim 13, wherein the glass body has an absorption coefficient greater than 10 $cm^{-1}$ at an output wavelength of the laser source.

19. The method of claim 13, wherein the laser source produces a beam having a focusable coherence length.

20. The device of claim 7, further comprising an optical resonator, wherein the waveguide structure is disposed within the optical resonator.

* * * * *